J. E. ANGER.
SLACK ADJUSTER.
APPLICATION FILED AUG. 30, 1913.

1,099,145.

Patented June 2, 1914.
2 SHEETS—SHEET 1.

J. E. ANGER.
SLACK ADJUSTER.
APPLICATION FILED AUG. 30, 1913.
1,099,145.
Patented June 2, 1914.
2 SHEETS—SHEET 2.
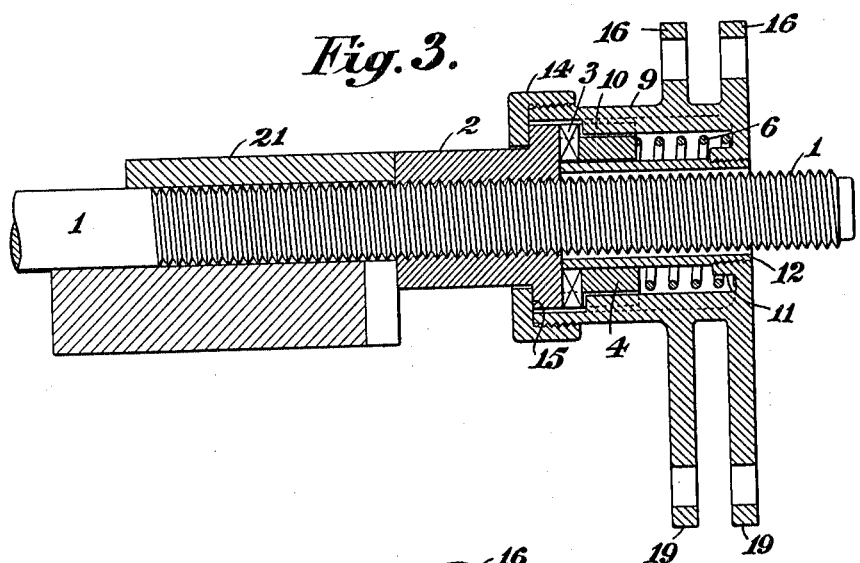
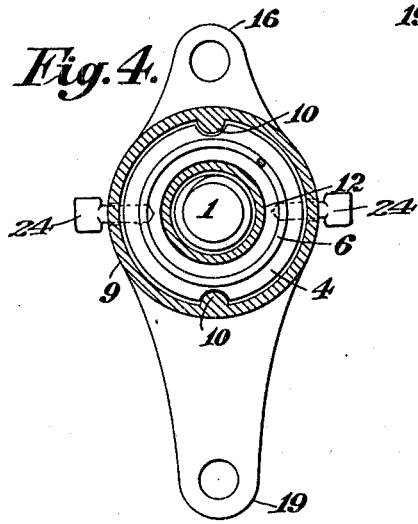
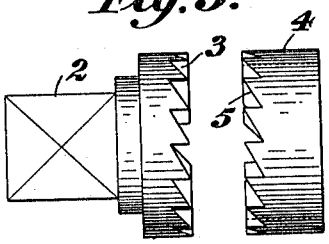
Witnesses
John P. Leary
A. McDonald
Inventor
J. E. Anger
By his Attorney
W. L. Thompson

UNITED STATES PATENT OFFICE.

JOHN EDWARD ANGER, OF PRESTON, ENGLAND.

SLACK-ADJUSTER.

1,099,145.

Specification of Letters Patent.

Patented June 2, 1914.

Application filed August 30, 1913. Serial No. 787,442.

*To all whom it may concern:*

Be it known that I, JOHN EDWARD ANGER, a citizen of the United States of America, residing at Preston, in the county of Lancaster, in the Kingdom of England, have invented certain new and useful Improvements in Slack-Adjusters, of which the following is a specification.

This invention relates to apparatus for automatically taking up the slack in the brakes of tramcars and the like.

According to the present invention, the usual pawls engaging ratchet teeth are dispensed with, and a ratchet feed is imparted by means of ratchet collars operating ratchet nuts, the ratchet teeth on the collars facing those on the nuts, and pressed into engagement by springs.

Figure 1:
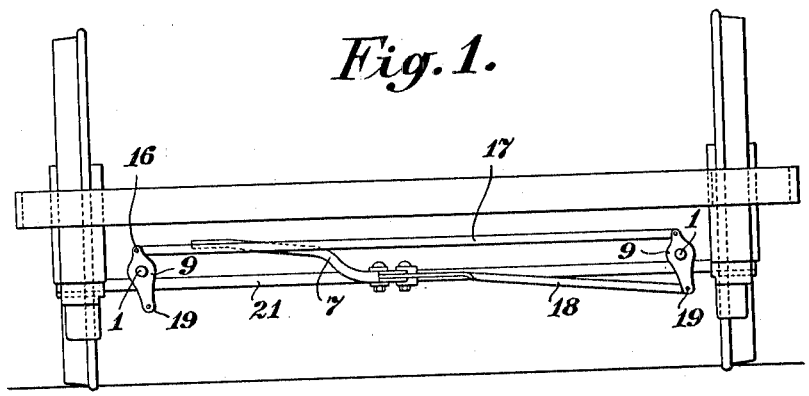
Figure 2:
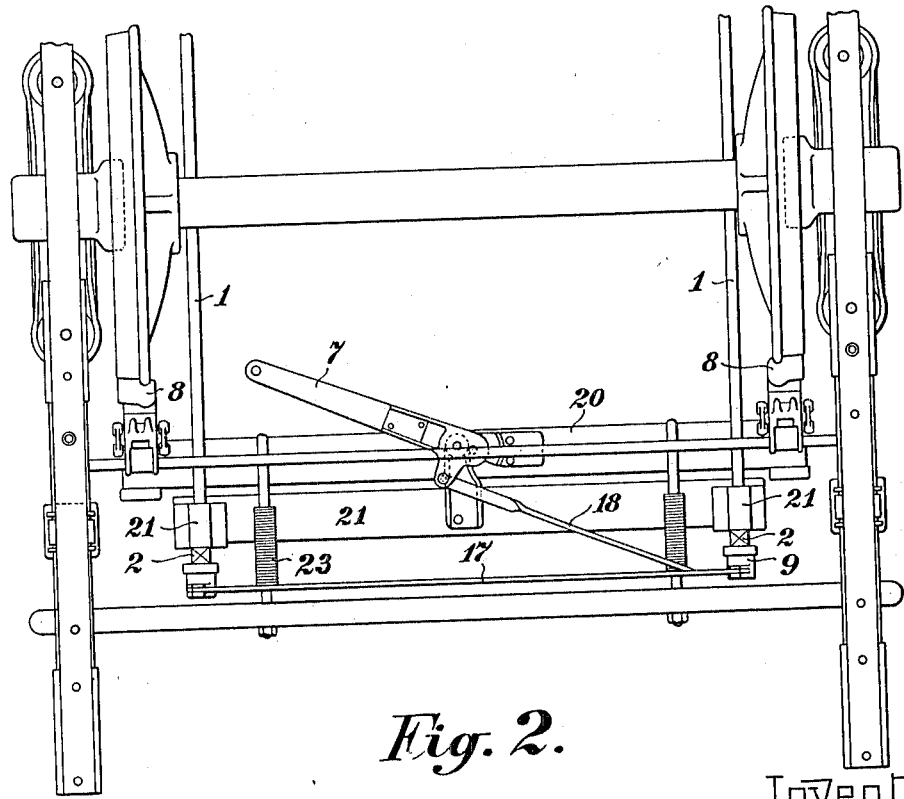

In the accompanying drawings:—Figure 1 is an end view showing my automatic slack adjuster applied to double rods on trucks; Fig. 2 is a plan view of same; Fig. 3 is a longitudinal section of the adjuster mechanism drawn to a larger scale; Fig. 4 is a cross section thereof; and Fig. 5 is a detail view of the ratchet collar and ratchet nut.

My invention is carried into effect as follows:—Upon the screwed part of the brake rods 1 is a nut 2 having ratchet teeth 3 cut upon its face, and mounted freely upon the said screwed rod 1 is an opposing collar 4 having ratchet teeth 5 also cut upon its face, the teeth on the face of the collar 4 engaging those on the face of the nut 2, and being held in mesh therewith by a spring 6. The collar teeth 5 therefore are held by the spring 6 in the interdental spaces of the teeth of the nut 2, the collar 4 rising as it turns one way and preventing backward motion of the nut 2, but turning the nut with it, when turned the other way. The arrangement is such that the operation of a brake lever such as 7 will operate this collar. Ordinarily the collar 4 oscillates back and forth on the toothed face of the nut 2 without any effect, but should the brake lever 7 from wear of the brake blocks 8 travel farther than a normal distance, the motion will cause the collar 4 to travel more than the length of a tooth, thus insuring that the backward motion of the toothed collar 4 will impart a ratchet feed to the nut 2 thereby shortening the working length of the brake rods 1 to the amount of wear that has taken place.

The arrangement for oscillating the toothed collar 4 each time the brake lever 1 is operated so that abnormal movements of the lever 1 will impart a ratchet feed to the nut 2, is as follows:—Journaled freely on the nut 2 is a tubular casing or box 9, this being hollow inside and projecting considerably beyond the nut 2, so as to contain compactly within it, not only the toothed portion of the nut, but also the ratchet collar 4 and spring 6, the screwed end of the brake rod 1 projecting at the front end of the box, and the squared end of the nut 2 projecting at the rear end. The collar 4 is keyed to the inside of this box 9 or held by a rib and groove as at 10, in such manner as to work solidly with it as regards rotary motion around the axis of the brake rod 1, while allowing the collar 4 to have freedom for independent longitudinal play. The front end of this casing 9 which has an inturned flange 11 screws on to the front end of an inner tube 12 which is sleeved freely on to the screwed end of the brake rod 1, the rear end of this tube entering an annular groove 13 in the face of the ratchet nut clear of the ratchet teeth 3. At the rear end, the casing has a back cap 14 screwed onto it, this cap being provided with a flange which abuts against a shoulder 15 on the nut 2 and holds all in place. The ratchet feed is thus inclosed in an absolutely dust proof manner. The ratchet collar 4 is by preference mounted freely on the said inner tube 12, and against the rear end of this inner tube 12 the nut 2 bears, so that a part of the nut is held between the end of the tube 12 and the flange of the back cap 14. There is a casing in connection with the nuts on both brake rods 1, and these casings are connected together in a pair, by providing exterior lugs 16 outside the casings coupled together by a connecting rod 17, so as to insure the slack being taken up equally at either side of the vehicle. The brake lever 7 is coupled by a connecting rod 18 to an arm 19 also projecting exteriorly from one of the casings.

There are two brake beams one of which 20 carries the brake blocks 8, while the other 21 (through which the brake rods 1 pass) abuts against the rear ends of the nuts 2. The brake lever 7 is so applied to these beams that in applying power it forces the brake blocks 8 against the wheels, and presses the other beams 21 against the nuts 2, and consequently the screwing up of the nuts 2 will shorten the working length of the brake rods 1 to the amount of wear that has taken place.

The mode of action is as follows:—In order to apply the brake, the brake lever 7 is pulled, and this causes the connecting rod 18 to turn the casings 9 and the ratchet collars 4 with them. At the outset with new brake blocks, the brake lever 7 will only have to travel a small distance to apply the brake blocks 8 to the wheels, so that each casing 9 will oscillate less than the length of a ratchet tooth, and the casings 9 with their ratchet collars 4 will oscillate back without operating the ratchet nuts 2 when the brake lever 7 is released, because the normal movement imparted to the ratchet collar 4 by the brake lever 7 is less than the distance of one ratchet tooth, so that ordinarily the ratchet collar 4 moves back and forth on the surface of the ratchet nut 2 without any effect. Should however the brake lever 7 from wear of the blocks 8, travel an abnormal distance, the motion of the casings 9 will cause the ratchet collars 4 to travel more than the length of a ratchet tooth, so that the ratchet teeth of the collars will fall into the next interdental spaces of the ratchet nut 2 rising as the casing 9 turns in one direction, but insuring that the backward motion of the casing will turn the ratchet collar 4 and nut 2. Upon releasing the brake lever 7, the springs 23 force the lever 7 back into its former position and likewise cause the connecting rods 17 to oscillate the casings 9 back and with them the ratchet collars 4, which will turn the ratchet nuts 2 the distance of one tooth, and thus the nuts 2 pressing against the beam 21 will tighten up the brake rods 1 to the amount of wear of the brake blocks that has taken place. This therefore takes up the slack and adjusts the brake blocks at both ends of the vehicle, and whenever the slack increases as to enable the brake lever 7 to move the casing 9 a greater angular distance, than a tooth of the ratchet nut 2, the slack is automatically taken up and safety and effective braking results are insured. By this means the brake is kept in proper adjustment so that the nuts can never loosen and are always moved in one direction.

To enable new brake blocks to be applied the ratchet collars 4 are moved longitudinally against the spring pressure, sufficient to clear the ratchet teeth on the nuts, this being effected by thumb levers 24 passing through slots in the casing 9 into the collar 4, and the nuts can then be turned back by hand, (by applying a spanner to the squared ends that project from the casing), to bring the blocks back far enough to enable them to be removed, and be replaced by new ones.

When the ratchet collar 4 is shifted longitudinally clear of the nut, the device is inoperative, and the arrangement becomes exactly similar in operation to the ordinary brake rigging.

I declare that what I claim is:—

1. The combination of two threaded brake rods, ratchet nuts thereon, ratchet collars mounted freely on said rods so as to be slidable thereon, but to work solidly with them as regards rotary motion, springs for holding the opposing ratchet teeth in mesh, a tubular casing journaled freely on each nut, containing within it the toothed portion of the nut, the ratchet collar and the spring, and external lugs on the casing for the connection of operating rods.

2. The combination of two threaded brake rods, ratchet nuts thereon having a peripheral shoulder at the end adjacent to the ratchet teeth, ratchet collars mounted slidably on said rods, springs for holding the opposing ratchet teeth in mesh, a tubular casing journaled freely on each nut and containing within it the toothed portion of the nut, the ratchet collar and the spring, an inturned flange at the end of the casing just beyond the peripheral shoulder of the nut, longitudinal feathers and grooves on the collars and casing to insure the collars working solidly with the casings as regards rotary motion, while allowing them to slide freely therein, and a connecting device for connecting the two casings in such manner that they must turn synchronously and equally.

3. The combination of two threaded brake rods, a ratchet nut on each of same, tubular casings containing within them the toothed portion of the nut, an inturned flange at the front end of each casing, an inner tube freely journaled on the screw-threaded end of each brake rod to which the inturned flange is screwed, a ratchet collar and spring within the tubular casing, a flanged back cap screwed on to the casing at the rear end whose flange abuts against a shoulder on the nut, and a connecting rod for connecting and synchronizing the motion of the two ratchet collars.

4. The combination of two threaded brake rods a ratchet nut on each of same, tubular casings containing within each the toothed portion of the nut, an inturned flange at the end of each casing, an inner tube sleeved freely on the screwed end of each brake rod and secured at one end in the inturned flange, while at the other end it abuts against a recess bounded by the ratchet teeth on the nut, a ratchet collar and a spring on the tube within each tubular casing, a flanged back cap at the rear end of each casing, between which the end of the tube and the nut is held, and a connecting device connecting the two collars in such manner that they must turn synchronously and equally.

5. The combination of two threaded brake rods, ratchet nuts thereon having ratchet teeth on their face, an opposing collar mounted freely on each rod having opposing teeth on its face for actuating said ratchet nuts, springs for holding the teeth normally in mesh but allowing the collar to rise as it turns one way, but turning the nut with it when turned the other way, a tubular casing journaled freely on each nut and containing within it the toothed portion of the nut, the ratchet collar and the spring, a lug on the outside of each casing, a connecting rod coupled thereto for connecting the two casings in such manner that they must turn synchronously and equally, and an auxiliary lug on the outside of one of the casings to which the brake lever is coupled by a connecting rod.

6. The combination of two threaded brake rods, a brake beam through which the brake rods pass, a nut having ratchet teeth on its face screwed on each rod so as to abut against the brake-beam, ratchet collars with opposing teeth actuating said ratchet nuts, a peripheral shoulder on each of said nuts, springs for holding the opposing ratchet teeth in mesh, tubular casings journaled freely on the peripheral shoulder of the nuts so as to leave a rear portion projecting, said ratchet casings containing within them the enlarged peripheral portion of the nuts, the ratchet collars and the springs, means for enabling the collars to be freely slidable on the rods while working solidly with the casings as regards rotary motion, and devices for connecting the two casings in such manner that they must turn synchronously and equally.

In witness whereof, I have hereunto signed my name this 18th day of August 1913, in the presence of two subscribing witnesses.

JOHN EDWARD ANGER.

Witnesses:
GEORGE HERMAN ANGER,
ARTHUR TAYLOR.

---

Copies of this patent may be obtained for five cents each, by addressing the "Commissioner of Patents, Washington, D. C."